Jan. 9, 1968  D. P. COOPER, JR., ET AL  3,362,309
EXPOSURE CONTROL APPARATUS

Filed March 8, 1965  4 Sheets-Sheet 1

INVENTORS
Dexter P. Cooper, Jr.
and
Vernon E. Ford
BY Brown and Mikulka
and
Charles S. McGuire
ATTORNEYS Jan. 9, 1968  D. P. COOPER, JR., ET AL  3,362,309
EXPOSURE CONTROL APPARATUS
Filed March 8, 1965  4 Sheets-Sheet 2

INVENTORS
Dexter P. Cooper, Jr.
and
Vernon E. Ford
BY Brown and Mikulka
and
Charles S. McGuire
ATTORNEYS Jan. 9, 1968  D. P. COOPER, JR., ET AL  3,362,309
EXPOSURE CONTROL APPARATUS
Filed March 8, 1965  4 Sheets-Sheet 3

INVENTORS
Dexter P. Cooper, Jr.
and
Vernon C. Ford
BY Brown and Mikulka
and
Charles S. McGuire
ATTORNEYS United States Patent Office 3,362,309
Patented Jan. 9, 1968

3,362,309
EXPOSURE CONTROL APPARATUS
Dexter P. Cooper, Jr., Lexington, and Vernon E. Ford, West Hanover, Mass., assignors to Polaroid Corporation, Cambridge, Mass., a corporation of Delaware
Filed Mar. 8, 1965, Ser. No. 437,903
19 Claims. (Cl. 95—10)

ABSTRACT OF THE DISCLOSURE

This disclosure depicts photographic exposure control apparatus, and more particularly depicts automatic exposure control apparatus wherein the effective aperture is varied continuously during exposure, and wherein a shutter means controlled by a photoresponsive shutter timing circuit effects an exposure interval related to the level of scene brightness.

---

Many embodiments of exposure control devices are presently known wherein an electronic switching circuit is used to establish a time period determinative of an exposure parameter such as "shutter speed" (i.e., exposure duration) or exposure aperture size. A photosensitive element such as a photoconductive cell is normally arranged in the circuit and receives light from the scene being photographed, whereby the time period established by the circuit, and thereby the exposure parameter controlled by the circuit, is a function of scene brightness. Thus, the exposure is effected "automatically," the proper amount of light being allowed to strike the film without the necessity of manual exposure settings by the operator.

It is the general practice in exposure control through electronic switching circuits to provide automatic control of only one exposure parameter. For example, shutter speed may be controlled by the circuit to provide a number of exposure times with a predetermined, fixed lens aperture. On the other hand, the switching circuit may provide control of the aperture size with a fixed shutter speed. Obviously, the range of brightness levels within which such a device would satisfactorily operate is more limited than that of a similar device which may use a number of shutter speeds with any of a number of aperture sizes. Many such devices, therefore, provide means for manually changing shutter speeds where aperture size is controlled automatically, and vice versa. Although such arrangements are effective to increase the operative range, the device is no longer "fully automatic" since manual adjustment is required under some conditions.

The exposure control apparatus of the present invention includes an adjustable diaphragm defining the aperture through which light enters to strike the film, and shutter means for initiating and terminating exposures of variable duration. An electronic switching circuit including a photoresponsive element establishes a time period between actuation and switching as a function of scene brightness. Exposure is initiated and the size of the exposure aperture begins changing in synchronism with actuation of the circuit. The shutter moves to terminate exposure in response to switching of the circuit at the end of the time period established thereby. The size of the exposure aperture at termination of exposure depends upon how much the diaphragm blades have moved during the time period. Accordingly, it is a principal object of the present invention to provide novel photographic exposure control apparatus wherein both aperture size and shutter speed are controlled automatically as a function of scene brightness.

A further object is to provide exposure control apparatus operable over a wide range of brightness levels in a fully automatic manner, wherein both exposure aperture size and shutter speed are established through the operation of an electronic switching circuit as a function of scene brightness.

Another object is to provide novel photographic exposure control apparatus automatically operated by an electronic switching circuit wherein the range of exposure values obtainable is achieved by differential attenuation of the light striking a photosensitive element in the circuit.

A still further object is to provide novel and improved exposure control apparatus automatically operable to provide a proper exposure over a wide range of brightness levels, and which is simple and reliable to use as well as economical in manufacture.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
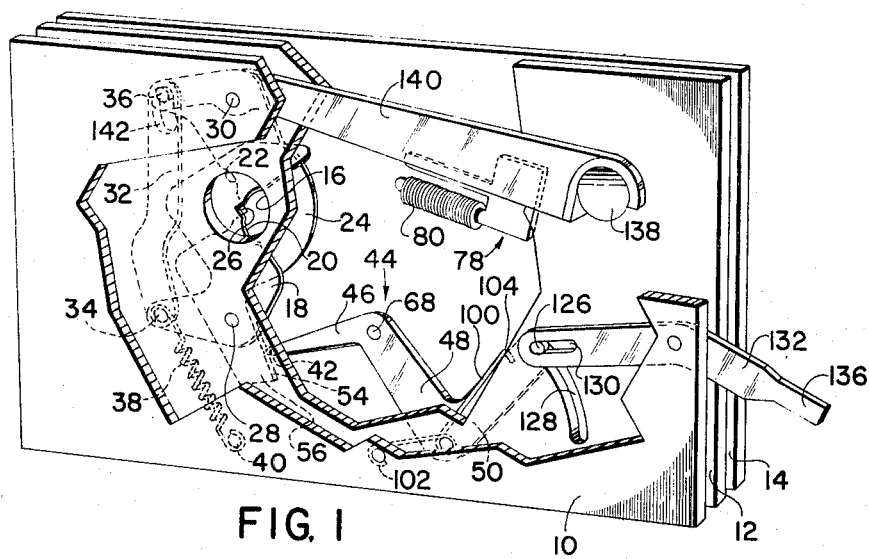
FIG. 1 is a front, perspective view, with portions broken away, showing certain elements of the apparatus of the invention in a first position.

In general, the present invention comprises an exposure control device for use in conjunction with any of a wide variety of photographic cameras previously known in the art and therefore not illustrated in the above-described drawings. The device includes a shutter having, in the illustrated embodiment, two blades which move sequentially to uncover and cover an exposure aperture and thereby determine exposure time. The shutter is held in its initial position and released for movement to effect an exposure through the action of magnetic fields which are controlled by an electronic switching circuit.

The aperture through which light passes to effect an exposure is variable in size according to the position of a set of movable diaphragm blades. These blades, like the shutter blades, are held in an initial position and actuated for movement to change the size of the exposure aperture as the control mechanism is actuated to initiate an exposure. The diaphragm blades continue moving until arriving at a second position which may be either before or after the shutter has moved to terminate exposure. The shutter and diaphragm blades have been shown separately in the accompanying drawings in order to achieve maximum clarity of illustration. It will be readily appreciated from the following description, however, that the two sets of blades are designed and positioned within the apparatus to function in a cooperative manner to effect automatically proper photographic exposures over a wide range of scene brightness levels.

Referring now to the drawings, the elements of the apparatus are shown mounted upon and enclosed by a set of three base members or plates designated as front plate 10, housing 12 and back plate 14. Although shown, for purposes of simplicity, as being substantially flat and rectangular, it will be readily understood that any or all of the plates may, if desired, take other shapes or be formed with appropriate projections or recesses for accommodating the various elements of apparatus.

Each of the plates includes an appropriate opening in registration with the optical axis of the camera wherein the device is used to permit the passage of light for exposures. Opening 16 in housing 12 is shown in FIGS. 1–5, and it is understood that front and back plates 10 and 14 include similar openings in registration therewith. An appropriate optical system for focusing a scene to be photographed at the film plane of the camera may be positioned in such openings, or in registration therewith, according to well-known practice.

Figure 2:
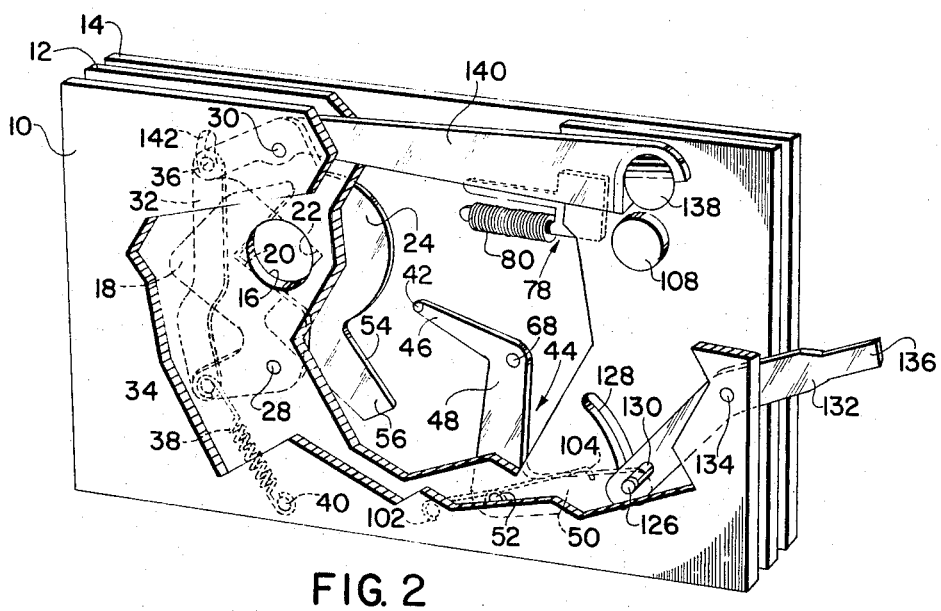
FIG. 2 is a front, perspective view of the elements of FIGURE 1 in a second position.

Diaphragm blade 18 includes generally V-shaped edge 20 which cooperates with similarly shaped edge 22 of diaphragm blade 24 to form, an exposure aperture, designated in FIGURE 1 by the reference numeral 26. Blade 18 is mounted upon housing 12, for pivotal movement with respect thereto, by means of pin 28. Blade 24 is mounted for pivotal movement on the housing by means of pin 30. Both blades are positioned between housing 12 and back plate 14. Rigid arm 32 is pivotally attached at one end to a portion of diaphragm blade 18 by means of pin 34. The other end of arm 32 is pivotally attached by pin 36 to a portion of diaphragm blade 24. Spring 38 is anchored at one end on fixed pin 40, which extends rearwardly from housing 12, and attached at its other end to pin 34. Thus, spring 38 exerts a downward force (as seen in FIGS. 1 and 2) on pin 34, tending to move diaphragm blade 18 in a counterclockwise direction about its pivotal mounting on pin 28. Such movement would also move arm 32 in a downward direction, thereby moving diaphragm blade 24 in a counterclockwise direction about its mounting on pin 30.

The diaphragm blades are restrained against the above-described movement when the apparatus is in the position shown in FIGURE 1 by means of pin 42. This pin extends from one end of a crank element, generally designated by the numeral 44, and including angularly disposed leg portions 46, 48 and 50. Crank 44 is pivotally mounted on housing 12 by pin 52 which meets the crank at the juncture of legs 48 and 50. Crank 44 is retained in the position of FIGURE 1, hereafter termed the "cocked" position, by means which will be described later. It may be seen that blade 24 is restrained against counterclockwise movement by contact of edge 54 of tail portion 56 with pin 42. Restraining blade 24 against movement in this manner also restrains movement of arm 32 and diaphragm blade 18 against the biasing force of spring 38. Consequently, movement of crank 44 to the position of FIG. 2 removes pin 42 from contact with edge 54 and allows movement of the diaphragm blades, as described above, to the position of FIG. 2. The aperture defined by edges 20 and 22 of the diaphragm blades in the position of FIG. 2 is obviously substantially different in size from aperture 26, defined by the blades in their FIGURE 1 position, and it is likewise obvious that the size of the aperture will be changed in a continuous manner as the blades are allowed to move under the influence of spring 38 from the position of FIGURE 1 to that of FIG. 2.

Figure 3:
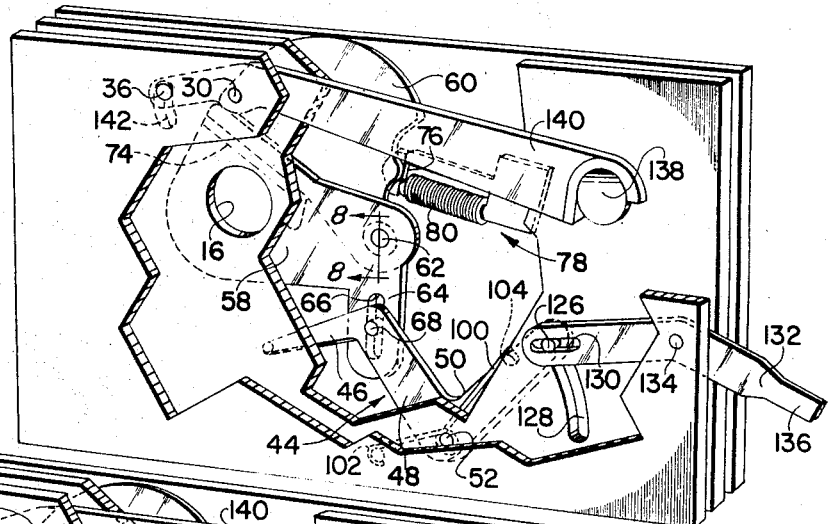
FIGS. 3–5 are also front, perspective views, showing other elements of the apparatus in different positions of their movement.
Figure 4:
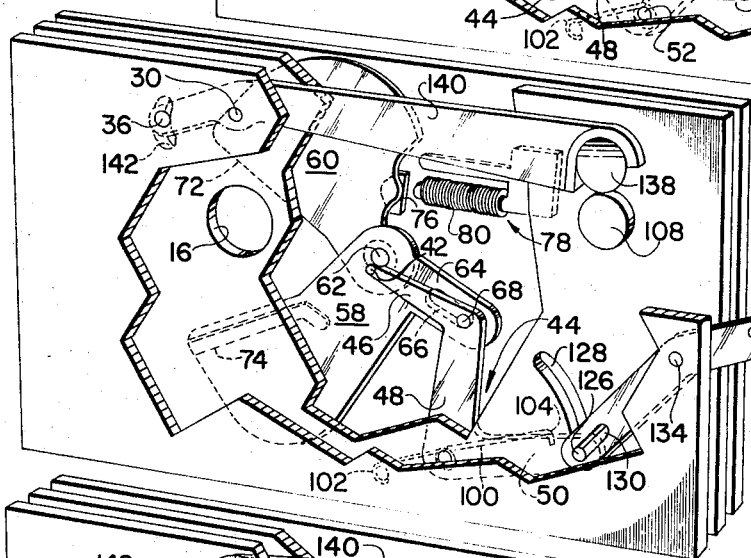

First shutter blade 58 and second shutter blade 60 are mounted upon pin 62 for pivotal movement about a common axes. Shutter blades 58 and 60 are adapted to move between covering and uncovering positions with respect to the exposure aperture defined by diaphragm blades 18 and 24. As shown in FIG. 3, shutter blades 58 and 60 are in the cocked position, corresponding to the FIGURE 1 position of the diaphragm blades, with shutter blade 58 entirely covering opening 16, and therefore the exposure opening formed by the diaphragm blades, and shutter blade 60 uncovering the opening. Shutter blade 58 includes tail portion 64 which has an elongated slot 66 therethrough. Pin 68 extends fixedly from crank 44 at the juncture of arms 46 and 48 through slot 66 in the tail portion of the first shutter blade. Thus, movement of crank 44 in a clockwise direction about its pivotal mounting on pin 52 (by means described hereinafter) produces counterclockwise movement of shutter blade 58 through the interconnection of pin 68 and slot 66. The position of shutter blade 58 after its counterclockwise movement in response to movement of crank 44 is shown in FIG. 4. Shutter blade 58 is now in uncovering relation to the exposure aperture, whereby light may pass therethrough to expose the film within the camera with which the exposure control device is associated.

Figure 8:
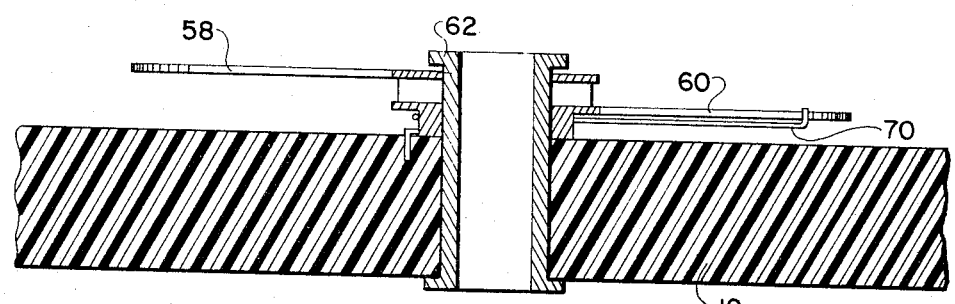
FIG. 8 is a fragmentary, side elevational view in section on the line 8—8 of FIG. 3.

Blade 60 is biased toward movement in a counterclockwise direction by coil spring 70, which is disposed about pin 62 with one end anchored on housing 12 and the other end bearing on blade 60, as best seen in FIG. 8. When shutter blade 58 is in the cocked position, leading edge 72 of blade 60 (FIG. 4) contacts rib 74 on blade 58, which extends from the latter into the path of movement of blade 60, which is thereby retained in the cocked position against the force of spring 70. Keeper element 76 is pivotally attached to a trailing edge portion of blade 60. Electromagnet 78, which is energized by passage of current through coil 80, is affixed to back plate 14 in such a position as to be contacted by keeper element 76 when blade 60 is in the cocked position. At least that portion of keeper element 76 which contacts the pole pieces of electromagnet 78 is made of a suitable magnetizable material, whereby blade 60 is retained in the FIG. 3 position against the force of spring 70 when electromagnet 78 is energized. It is therefore evident that the magnitude of the holding power of electromagnet 78 must be in excess of the biasing force of spring 70. When the electromagnet is deenergized by cutting off or substantially reducing the current through coil 80, blade 60 is allowed to move to the position of FIG. 5, hereafter termed the "rest" position of the shutter blades.

Figure 6:
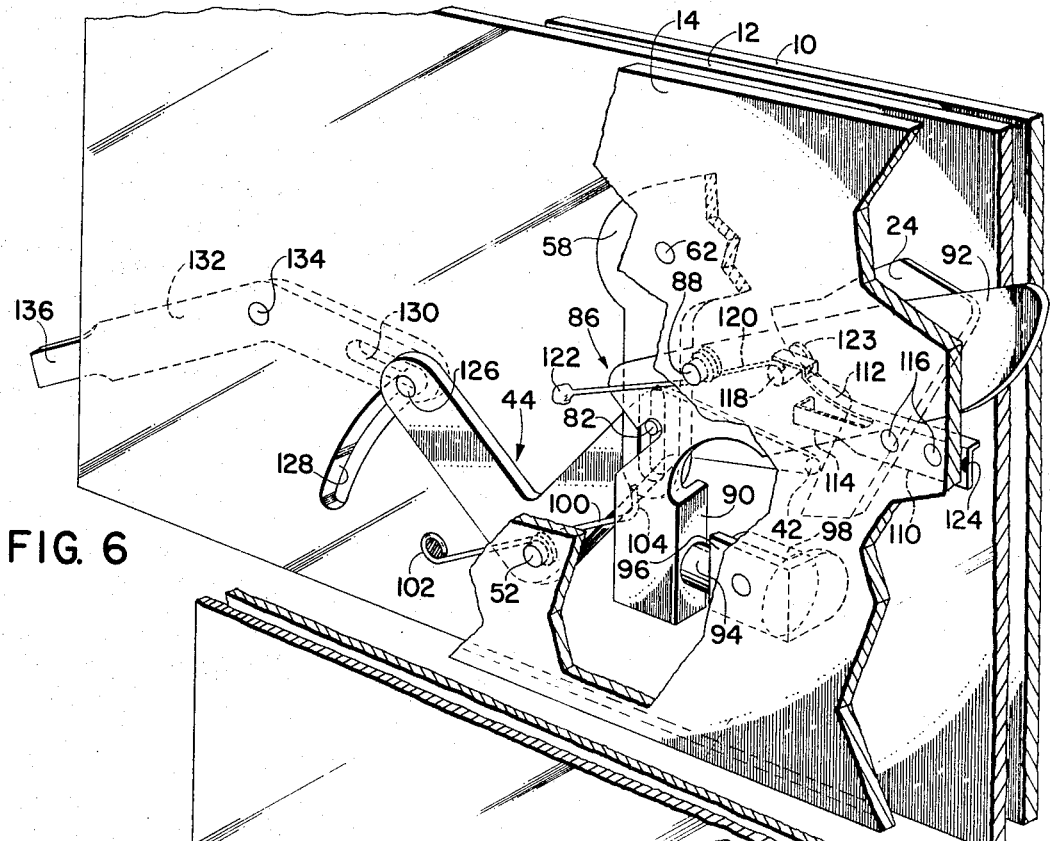
FIGS. 6 and 7 are rear, perspective views showing still other elements and the manner of operation thereof in cooperation with the elements of the preceding figures.
Figure 7:
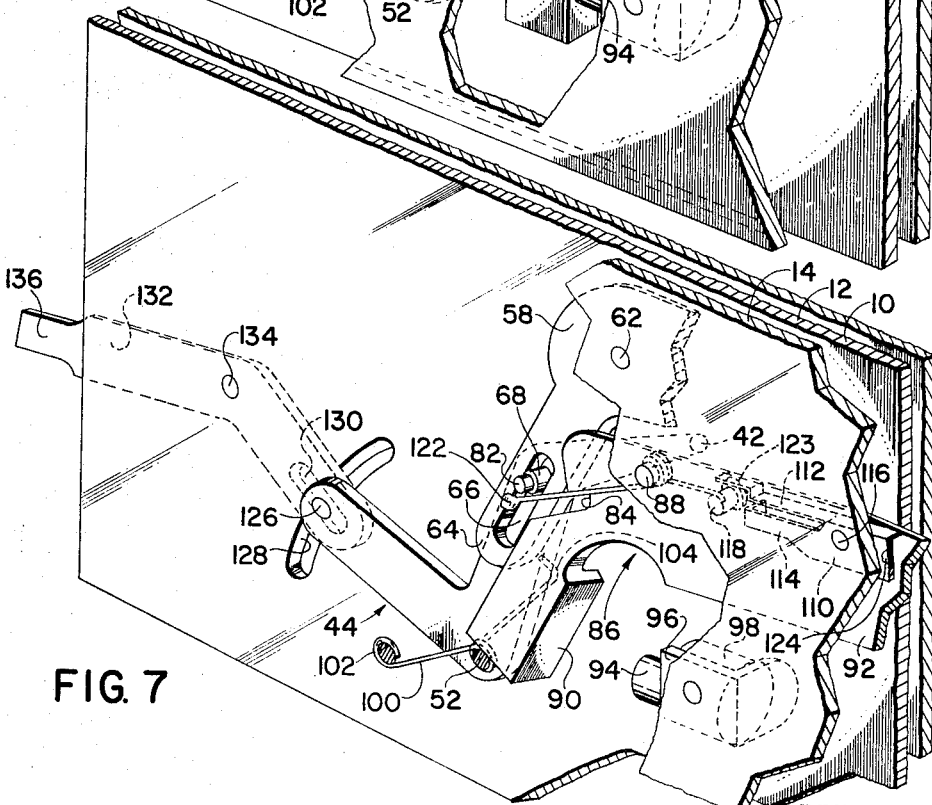

As best seen in FIG. 7, end portion 82 of pin 68 is of somewhat smaller diameter than that portion of the pin which passes through slot 66 of shutter blade 58 and is attached to crank 44. End 82 is positioned so as to be engaged in notch 84 of pivotal release arm 86 when crank 44 is in the cocked position shown in FIGS. 1, 3 and 6. Release arm 86 is mounted for reciprocal pivotal movement upon and about pin 88, which is anchored in back plate 14, and includes face portion 90 on one side of the pivotal mounting and tail portion 92 on the opposite side. Face portion 90 is arranged to contact an end of permanent magnet 94, which is fixedly attached by means of mounting bracket 96 to back plate 14, when release arm 86 is in the position of FIG. 6. Coil 98 is disposed about permanent magnet 94 in such a way that when an electric current is passed through the coil the induced magnetic field associated with the current-carrying coil is opposed in polarity to permanent magnet 94. Thus, when current is passed through coil 98, release arm 86 is no longer retained in the FIG. 6 position by the attracting force of permanent magnet 94, but is free to move about its pivotal mounting on pin 88.

Figure 5:
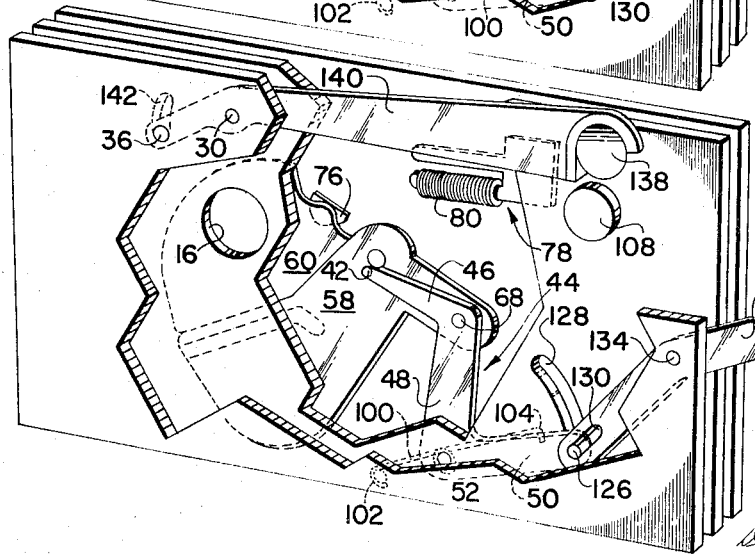

Coil spring 100 is disposed about pin 52, which provides the pivotal mounting for crank 44, with one end 102 anchored to housing 12 and the other end 104 bearing on arm 50 of crank 44, thereby tending to rotate the crank in a clockwise direction as seen from the front in FIGS. 1–5, or counterclockwise as seen in FIGS. 6 and 7. When crank 44 is in the position of FIG. 6, movement thereof under the force of spring 100 is prevented by engagement of end portion 82 of fixed pin 68 with notch 84 of release arm 86 so long as the latter is held by permanent magnet 94. Upon releasing the holding force of the permanent magnet by passing current through coil 98, release arm 86 is moved clockwise as shown in FIGS.

6 and 7, since crank 44 is no longer retained by the arm and may move under the bias of spring 100.

Movement of crank 44 from the position of FIG. 6 to that of FIG. 7 moves shutter blade 58 as previously explained. Also, since pin 42 has been moved away from its blocking position with respect to edge 54 of diaphragm blade 24, the two diaphragm blades are free to move from their position of FIGURE 1 toward that of FIG. 2. Thus, if current is passed through both coils 80 and 98 an exposure is initiated by moving shutter blade 58 to uncover the exposure aperture while retaining shutter blade 60 in its uncovering position, and the exposure aperture begins changing continuously in size as the diaphragm blades move. The exposure may be terminated by cutting off the current through coil 80, thus allowing shutter blade 60 to move to its rest position, as previously explained.

Figure 9:
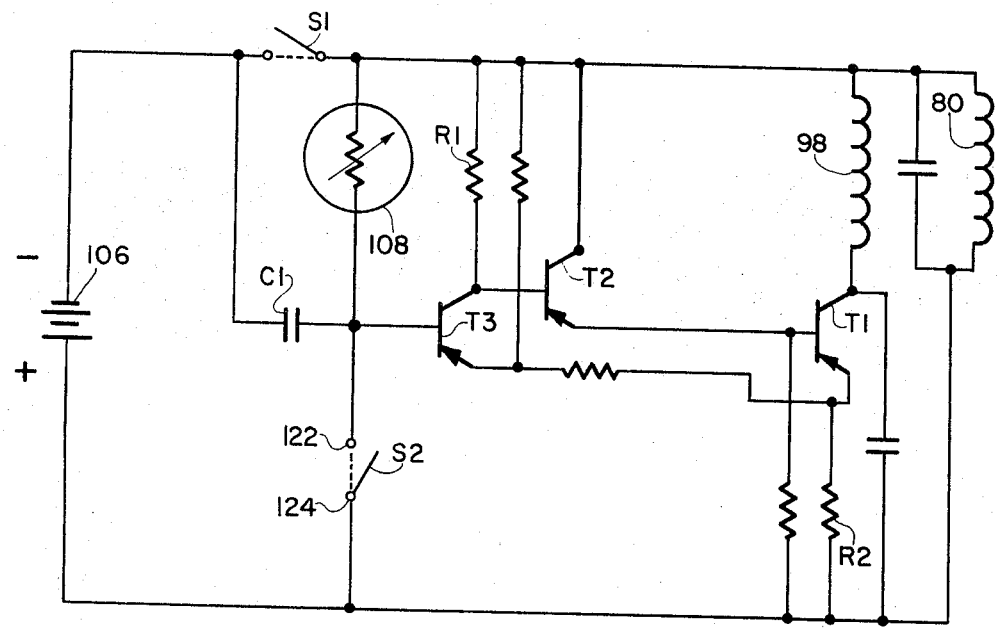
FIG. 9 is a schematic wiring diagram of an electronic switching circuit suitable for use in conjunction with the apparatus of the present invention.

In FIG. 9 is shown a suitable circuit for actuating the device to initiate exposures in the manner explained above, as well as for maintaining the second blade in its cocked position for a predetermined time period which is established as a function of circuit parameters. Like reference numerals are used for the schematic counterpart in FIG. 9 of elements of the circuit shown in other figures of the drawings, such as the coils and photocell.

Included in the circuit are an electric power source, such as battery 106, and a light-sensitive cell 108 which is also seen in FIGS. 1–5 facing the side of the apparatus from which light enters the exposure aperture. Switch S1 is interposed in the circuit and is closed by operation of the shutter releases button or lever (not shown) normally placed at some convenient point on the camera body or shutter housing. Such buttons are usually depressed or otherwise moved manually to actuate the shutter mechanism and switch S1 may comprise a pair of contacts which are moved together by such movement of the shutter release button. It will be noted that when the blades are in the cocked position, prior to making an exposure, S1 is open.

A second switch S2 is closed when the shutter blades are cocked, and is opened by movement of release arm 86. Element 110, having movable arm 112 and fixed arm 114, is anchored to back plate 14 by means of screws or rivets 116, thus being positioned between the back plate and the tail portion of the release arm. Pin 118 is affixed in tail portion of release arm 86 to extend therefrom toward back plate 14, but not in contact with the latter. Coil spring 120 is anchored at end 122 thereof to base plate 14, passes around an electrically insulating bearing on pin 88 upon which release arm 86 is pivotally mounted, and bears upon pin 118, thereby exerting a clockwise rotational force on release arm 86 as seen from the rear in FIGS. 6 and 7.

Element 110, pin 118 and spring 120 are all constructed of suitable electrically conducting material, whereby the point indicated at 124 on element 110 is electrically connected to end 122 of spring 120 when release arm 86 is in the position shown in FIG. 6. Pin 118 is electrically insulated from release arm 86 by bushing 123 of plastic, rubber or other suitable insulating material. As the release arm moves away from the position of FIG. 6, pin 118 moves in a generally downward direction and movable arm 112 moves therewith, being somewhat resilient and flexed from its normal position when the elements are in the cocked position. Upon contacting fixed arm 114 of element 110, arm 112 is abruptly stopped while pin 118 continues to move to the FIG. 7 position. Thus, the electrical connection of point 124 with end 122 is broken when pin 118 moves out of contact with arm 112.

Electrical leads (not shown) comprising a portion of the timing circuit are connected, as by soldering, at end 122 and point 124. In FIG. 9 the opposite sides of the schematic representation of switch S2 are designated 122 and 124, corresponding to the physical points shown in FIGS. 6 and 7. It may therefore be seen that movement of release arm 86 from the position shown in FIG. 6 to that shown in FIG. 7 serves to open switch S2 in the manner described. It will also be noted that spring 120 will serve to maintain release arm 86 in its position of FIG. 7 until the shutter is recocked, as described hereinafter.

With the shutter in the cocked position (S1 open) no current is flowing through coils 80 and 98. Operation of the camera shutter release button closes S1, allowing current to flow from battery 106 through coils 80 and 98, thus creating an induced magnetic field associated with coil 98 and energizing electromagnet 78 associated with coil 80. As previously mentioned, the current flows through coil 98 in such a direction that the induced magnetic field associated therewith is opposed to the field of permanent magnet 94. Thus, as soon as switch S1 is closed, the attraction of magnet 94 for release arm 86 is eliminated or reduced sufficiently so that spring 100 may move crank 44 and thereby blade 58 from the position of FIG. 3 to that of FIG. 4. Release arm 86 is likewise moved from its position of FIG. 6 to that of FIG. 7 with consequent opening of switch S2 as previously explained.

Since electromagnet 78 is energized as soon as switch S1 is closed, blade 60 is retained in its cocked position by attraction of the magnet for keeper element 76 when blade 58 moves away from its cocked position. Current will cease to flow through coil 80, deenergizing electromagnet 78 and allowing blade 60 to terminate the exposure, through the operation of the electronic switching circuit shown in FIG. 9. Such circuits have previously been used in connection with photographic exposure control apparatus and the illustrated circuit is but one of many embodiments suited for such application.

It may be readily seen from the foregoing description that the duration of exposure through the aperture defined by diaphragm blades 18 and 24 will correspond substantially to that period from the time current begins to flow through coils 80 and 98 to the time when the current through coil 80 is shut off. This period is established in the present circuit by the time rate of discharge of capacitor C1. When the device is in the cocked position with S1 open and switch S2 closed, capacitor C1 will be charged. When switch S1 is closed, allowing current to flow through coils 80 and 98, blade 58 will move away from its initial position and begin the exposure interval by uncovering the exposure aperture. As blade 58 and release arm 86 move to initiate the exposure interval, switch S2 opens as previously described and capacitor C1 begins to discharge through photocell 108. When switch S1 is closed and current begins to flow, transistors T1 and T2 are conducting. Transistor T3 is not conducting since capacitor C1 has a maximum charge at this time, thus making the base of transistor T3 more positive than its emitter. As capacitor C1 discharges, the base of transistor T3 becomes more negative until, when capacitor C1 has discharged to a predetermined level, transistor T3 begins to conduct. With current flowing through transistor T3 the voltage drop across resistor R1 causes the base of transistor T2 to become more positive. Transistor T2 will stop conducting and thus switch off the base current of transistor T1 when the base of transistor T2 becomes more positive than its emitter. Switching off of transistor T1 stops the flow of current through coil 80, deenergizing electromagnet 78 and allowing blade 60 to move to its rest position to terminate the exposure. Switch S1 is opened as soon as the operator allows the shutter release button to return to its initial position. This cuts off the flow of current through coil 98 so that the field of permanent magnet 94 is restored and face portion 90 of release arm 86 will be attracted thereby, retaining the device in the cocked position when it is returned thereto.

A positive feedback is also provided in the circuit for faster response. That is, when transistor T1 begins to stop conducting the reduction in voltage drop across resistor R2 causes the emitter of transistor T1 to become more positive even faster than the discharge of capacitor C1, thus switching off transistors T2 and T1 faster.

The time for which the exposure aperture is uncovered to admit light is therefore a function of the time rate of discharge of capacitor C1. Since the rate of discharge of capacitor C1 is determined by the electrical properties of photocell 108 and these in turn are determined by the intensity of light incident thereon, the duration of exposure is functionally related to the scene brightness. The timing sequence of the circuit is initiated when capacitor C1 begins to discharge. This occurs upon opening of switch S2 in response to movement of blade 58 away from the covering position. Hence, the timing sequence begins substantially simultaneously with the actual exposure and is a function of scene brightness, thus insuring a proper exposure interval.

After the elements of the device have moved to the rest position shown in FIGS. 2, 5 and 7, they may be returned to their initial position by a manual cocking operation preparatory to making another exposure. Pin 126 extends from the free end of leg 50 of crank 44 through slot 128 in housing 12. Pin 126 further extends through slot 130 in cocking lever 132 which is pivotally mounted upon pin 134 between front plate 10 and housing 12. Thus, rotation of crank 44 in a clockwise direction about its pivotal mounting on pin 52 produces counterclockwise rotation of cocking lever 132. End portion 136 of the cocking lever extends past the edge of the housing to a position wherein it may be manually manipulated. Movement of end portion 136 from the position of FIG. 2 to that of FIGURE 1, for example, will obviously counter-rotate crank 44, against the bias of spring 100, back to its cocked position. The shutter and diaphragm blades will also be moved to their cocked positions due to the movement of pins 68 and 42, respectively. End 82 of pin 68 will engage in notch 84 of release arm 86 and counter-rotate the arm until face portion 90 again contacts permanent magnet 94, which again retains the elements in the cocked position as before.

It is evident from the foregoing description that shutter blade 58 and release arm 86 are moved positively by movement of crank 44 while diaphragm blades 18 and 24 are moved under the force of spring 38 after pin 42 has been moved away from its blocking position with respect to edge 54 of diaphragm blade 24. That is, there is a direct, mechanical connection (i.e., pin 68 and end portion 82 thereof) between crank 44 and the shutter blade and release arm which obviously produces immediate and cooperative movement of the latter two elements when the crank is moved. On the other hand, spring 38 must overcome the inertial and frictional forces associated with the diaphragm blades and associated elements before the latter begin to move and change the size of the exposure aperture.

The amount of time required for the diaphragm blades to begin moving after movement of crank 44, as implied above, is a function of the static inertia and friction of the system and the rate or biasing force of spring 38. These factors may be controlled and fixed at desired values in the design of the device, in accordance with practices familiar to those skilled in the art. Assuming the device has been so designed that 1/500 of a second elapses between movement of crank 44 to initiate an exposure and the time when diaphragm blades 18 and 24 first begin to move, it is evident that during this first 1/500 second the exposure is being effected through an aperture which is fixed in size, and thereafter through an aperture which varies in size over a second time period until reaching the maximum aperture size shown in FIG. 2. In other words, only exposure time varies for the first 1/500 second after movement of shutter blade 58 to initiate exposure and opening of switch S2 to initiate the timing operation, while both exposure time and the size of the exposure aperture vary thereafter. If the device is to be used for making exposures at high light levels (e.g., EV 21) on a highly sensitive film (e.g., ASA 3000) a proper exposure may be effected in 1/500 second or less with an exposure aperture as defined by the diaphragm blades in their initial position. In this event the circuit must be so calibrated and the properties of the electrical components thereof (including photocell 108) so selected that a proper exposure time is provided when the exposure aperture remains fixed in size. On the other hand, the circuit must be constructed and calibrated to take into account the increase in exposure aperture size with respect to time after the first 1/500 second.

Of course, it is possible that the proper amount of light will have struck the film while diaphragm blades 18 and 24 are still in motion, in which case shutter blade 60 moves to terminate exposure by covering an exposure aperture which is still varying in size. It is evident that the diaphragm blades will continue moving to their rest position of FIG. 2 whether exposure has been terminated or not, but this does not affect the exposure in any way once shutter blade 60 has moved to its rest position. In speaking of the aperture size in terms of the customary $f$ numbers for the present exposure control device, it must be taken into account that the aperture size changes during exposure, except for the very short duration exposures discussed above. For example, if the aperture defined by the diaphragm blades in their cocked position of FIGURE 1 is equivalent to $f/80$, it would be proper to describe a particular exposure as effected at $f/80$ for 1/500, since the aperture size is constant over the duration of the exposure. However, if the aperture size has increased to the equivalent of $f/16$ in 1/20 of a second after initiation of exposure and timing, it would not be proper to describe the exposure as $f/16$ for 1/20, since the aperture size is $f/16$ only at the moment exposure is terminated and the amount of light striking the film would be less than the amount which would have struck the film if the aperture had been at $f/16$ over the entire duration of exposure. However, it is possible to calculate an "equivalent" or "integrated" exposure aperture size for any given time lapse after initiation of exposure, if the initial size of the aperture defined by the diaphragm blades and the time-rate of change in the size of the aperture after the initial delay are known. For example, if the initial aperture is $f/80$ and after 1/20 of a second has increased to $f/16$, the exposure may be equivalent to a 1/20 of a second exposure with a fixed aperture of $f/45$ for the particular rate of movement of the diaphragm blades which is built into the device. Thus, the "program" of the shutter may be calculated, based on the equivalent aperture sizes for each given time period after initiation of exposure, and the circuit calibrated to cause termination of exposure in the manner explained earlier when the proper amount of light has been allowed to pass through the aperture.

Since it is necessary to calibrate the circuit to provide proper exposures at a given light level when the aperture has changed in size during exposure, an error will result when the aperture size does not change during exposure, as for exposures shorter than 1/500 second, in the example given above. This may be remedied by changing the relationship between the intensity of scene brightness and the intensity of light which strikes the photocell during the time for which the exposure aperture remains constant in size. In the illustrated embodiment, this compensation is effected by placing filter 138 between photocell 108 and light from the scence being photographed when the device is cocked, as in FIGS. 1 and 3. Filter 138 is carried on the end of arm 140 which is positioned between front plate 10 and housing 12. Arm 140 is pivotally mounted upon the same pin 30 upon which diaphragm blade 24 is mounted and is attached at the end opposite filter 138 to pin 36, which also connects blade 24 to arm 32. Slot 142 is provided in housing 12 so that pin 36 may pass therethrough and move with the diaphragm blades between the cocked and rest positions. Movement of arm 32 away from the position of FIGURE 1 causes rotation of arm 140 in a counterclockwise direction about pin 30, thus removing filter 138 from its covering position with respect to photocell 108.

Filter 138 is preferably darker at the top portion thereof, that is, the portion which is first removed from covering relationship with photocell 108 when arm 140 begins to move. In this way the attenuating effect of filter 138 on light striking photocell 108 is diminshed quite rapidly as soon as the diaphragm blades begin to move to change the size of the exposure aperture. Of course, other well-known means, such as a variable aperture in an opaque plate, may be used to perform the light attenuating function of filter 138. The particular amount of attenuation required may be calculated according to known techniques in dependence upon the size of the aperture before the diaphragm blades begin to move, the time delay before movement and the subsequent rate of movement thereof.

It is thus evident that the exposure control device of the present invention provides fully automatic control of exposures by allowing only the proper amount of light to strike the film, for virtually any level of scene brightness, with no manual setting by the operator. The range of light levels over which the device will reliably provide automatic control is very broad since both aperture size and exposure duration are varied during exposure, rather than only one. Any one of a wide variety of programs, i.e., the exposure value established by the device in response to a given light level, may be selectively built into the device by proper calibration of the circuit according to known techniques. Also, it is possible to selectively change the program of the device by previously known means, such as a selector switch for changing the capacitance which controls triggering of the circuit. In this way the device may be selectively switched between two settings, for example, to provide proper exposure for films of two different sensitivities.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic exposure control apparatus comprising, in combination:
    (a) diaphragm means movable from a first position, wherein an exposure aperture of one area is defined thereby, to a second position, wherein an exposure aperture of a different area is defined thereby;
    (b) shutter means movable between covering and uncovering positions with respect to said exposure aperture to effect an exposure therethrough;
    (c) an electronic trigger circuit including photosensitive means arranged to receive light from the scene being photographed and having an electrical property functionally related to the intensity of light incident thereon, said photosensitive means being so arranged in said circuit that the time period between actuation and triggering of said circuit is a function of scene brightness;
    (d) actuating means operable to actuate said circuit; and
    (e) means for moving said shutter means from said covering to said uncovering position and said diaphragm means from said first toward said second position in response to actuation of said circuit; and
    (f) means for moving said shutter means from said uncovering to said covering position in response to triggering of said circuit, whereby the exposure interval during which said shutter means uncovers said exposure aperture and the extent of movement of said diaphragm means toward said second position during said exposure interval are functions of said time period established by said circuit.

2. Exposure control apparatus according to claim 1 wherein said exposure aperture varies continuously in area as said diaphragm means move from said first to said second position.

3. Exposure control apparatus according to claim 2 wherein said one area is significantly smaller than said different area and said shutter means moves to said uncovering position while said diaphragm means is in said first position.

4. Exposure control apparatus according to claim 3 wherein said shutter and diaphragm means are initially retained in said covering and first positions, respectively, by magnetic means which are released in response to actuation of said circuit.

5. Photographic exposure control apparatus comprising, in combination:
    (a) diaphragm means movable from a first position, wherein an exposure aperture of one area is defined thereby, and a second position, wherein an exposure aperture of a different area is defined thereby;
    (b) shutter means movable between covering and uncovering positions with respect to said exposure aperture to effect an exposure therethrough;
    (c) an electronic trigger circuit including photosensitive means arranged to receive light from the scene being photographed and having an electrical property functionally related to the intensity of light incident thereon, said photosensitive means being so arranged in said circuit that the time period between actuation and triggering of said circuit is a function of scene brightness;
    (d) actuating means operable to actuate said circuit;
    (e) variable light attenuating means associated with said photosensitive means and adapted to vary the proportion of available scene light which impinges upon said photosensitive means between first and second amounts;
    (f) release means movable in synchronization with actuation of said circuit;
    (g) means for so interconnecting said diaphragm, shutter and light attenuating means that said shutter means moves from said covering to said uncovering position, said diaphragm mean moves from said first toward said second position, and said attenuating means changes the proportion of light impinging upon said cell from said first toward said second amount in response to movement of said release means; and
    (h) means for moving said shutter means from said uncovering to said covering position in response to triggering of said circuit, whereby the exposure interval during which said shutter means uncovers said exposure aperture and the extent of movement of said diaphragm means toward said second position during said exposure interval are functions of said time period established by said circuit.

6. Exposure control apparatus according to claim 5 wherein said light attenuating means comprises a movable member having a portion arranged between said photosensitive means and the scene light, said movable member being interconnected with a portion of said diaphragm means for movement therewith.

7. Exposure control apparatus according to claim 6 wherein said portion of said light attenuating means comprises an optical filter.

8. Exposure control apparatus according to claim 7 wherein said photosensitive means comprises a photoconductive cell.

9. Exposure control apparatus according to claim 8 wherein said release means are initially restrained against movement by magnetic means which allow movement of said release means upon actuation of said circuit.

10. Photographic exposure control apparatus comprising, in combination:
    (a) diaphragm means movable from a first position, wherein an exposure aperture of relatively small area is defined thereby, to a second position, wherein an exposure aperture of significantly larger area is defined thereby, said exposure aperture varying continuously from said small to said larger areas during movement of said diaphragm means between said first and second positions;
(b) first and second opaque shutter blades movable from a cocked position, wherein said first blade covers and said second blade uncovers said exposure aperture, to an exposure position, wherein both of said blades uncover said exposure aperture, to a rest position, wherein said first blade uncovers and said second blade covers said exposure aperture;
(c) an electronic trigger circuit including photosensitive means arranged to receive light from the scene being photographed and having an electrical property functionally related to the intensity of light incident thereon, said photosensitive means being so arranged in said circuit that the time period between actuation and triggering of said circuit is a function of scene brightness;
(d) actuating means operable to actuate said circuit;
(e) means for biasing said diaphragm means toward movement from said first to said second position;
(f) means for biasing said shutter blades toward movement from said cocked to said rest position;
(g) retaining means positionable to hold said diaphragm means and said shutter blades in said first and cocked positions, respectively;
(h) release means for moving said retaining means away from the holding position, thereby allowing movement of said diaphrgam means away from said first position and said shutter blades away from said cocked position, in response to actuation of said circuit; and
(i) means for retaining said second shutter blade in uncovering relation to said exposure aperture upon actuation of said circuit and effective to release said second blade for movement to said rest position in response to triggering of said circuit.

11. Exposure control apparatus according to claim 10 wherein said diaphragm means are so constructed and arranged with respect to said shutter blades that said first blade moves to uncover said exposure aperture, thereby placing said blades in said exposure position, before said diaphragm means has moved away from said first position, whereby each exposure is initiated with an exposure aperture of said relatively small area.

12. Exposure control apparatus according to claim 11 and further including cocking means manually operable to effect return of said shutter blades from said rest to said cocked position and said diaphragm means from said second to said first position.

13. Exposure control apparatus according to claim 12 wherein said retaining means are maintaining in said holding position by a permanent magnet and said release means comprise a coil through which current flows upon actuation of said circuit to create an induced magnetic field which opposes the field of said permanent magnet.

14. Exposure control apparatus according to claim 13 wherein said means for retaining said second shutter blade comprise an electromagnet which is energized in response to actuation of said circuit and deenergized in response to triggering of said circuit.

15. Exposure control apparatus for a camera having an optical axis and adapted to effect photographic exposures of a scene in response to the level of brightness thereof, said apparatus comprising, in combination:
(a) diaphragm means arranged to define an exposure aperture concentrically with said optical axis and movable between a first position, wherein an aperture of relatively small area is defined thereby, and a second position, wherein an aperture of significantly larger area is defined thereby, said diaphragm means comprising a plurality of blades which are so moved from said first to said second position as to increase in a continuous manner the area of said aperture from said relatively small to said larger area;
(b) a first shutter blade movable from an initially covering to an uncovering position with respect to said exposure aperture to initiate an exposure therethrough;
(c) a second shutter blade movable from an initially uncovering to a covering position with respect to said aperture to terminate said exposure;
(d) first biasing means urging said diaphragm means toward movement from said first to said second position;
(e) second biasing means urging said first shutter blade toward movement from its covering to its uncovering position;
(f) third biasing means urging said second shutter blade toward movement from its uncovering to its covering position;
(g) retaining means movable from a holding position, wherein said retaining means holds said diaphragm means in said first position and said first shutter blade in its covering position, to a release position, wherein said retaining means allows movement of said first shutter blade to its uncovering position and said diaphragm means toward said second position under the influence of their respective biasing means;
(h) first means associated with said first shutter blade for holding said second shutter blade in its uncovering position when said first blade is in its covering position;
(i) second means for holding said second shutter blade in its uncovering position after said first blade has moved to its uncovering position;
(j) an electronic trigger circuit including photosensitive means arranged to receive light from the scene being photographed and having an electrical property functionally related to the intensity of light incident thereon, said photosensitive means being so arranged in said circuit that the time period between actuation and triggering of said circuit is a function of scene brightness;
(k) actuating means operable to actuate said circuit;
(l) means for moving said retaining means from said holding to said release position in response to actuation of said circuit; and
(m) means effecting release of said second means, thereby allowing movement of said second blade to its covering position, in response to triggering of said circuit, whereby the exposure time between uncovering movement of said first shutter blade and covering movement of said second shutter blade and the extent of movement of said diaphragm means during said exposure time are functions of said time period established by said circuit in response to scene brightness.

16. Exposure control apparatus according to claim 15 and further including light attenuating means movable in response to actuation of said circuit from a first position, wherein said attenuating means is effective to reduce the intensity of light from said scene which impinges upon said photosensitive means, to a second position, wherein light from said scene impinges upon said photosensitive means without attenuation.

17. Exposure control apparatus according to claim 16 wherein said light attenuating means is so constructed and arranged that light from said scene is attenuated in a substantially continuous, decreasing manner during movement of said attenuating means from a maximum predetermined amount when in said first position to zero attenuation when in said second position.

18. Exposure control apparatus according to claim 17 wherein said light attenuating means comprises an element positioned at least partly between said photosensitive means and said scene when said attenuating means is in its first position and arranged on a movable member which is interconnected with said diaphragm means for movement therewith.

19. Exposure control apparatus according to claim 18 wherein said circuit comprises two coils through which current flows upon actuation of said circuit, the induced magnetic field associated with one of said coils being effective to result in movement of said retaining means from said holding to said release position, and the induced magnetic field associated with the other of said coils being effective to retain said second shutter blade in its uncovering position, the current through said second coil being switched off by triggering of said circuit.

References Cited

UNITED STATES PATENTS 3,218,949  11/1965  Kiper _____ 95—10

FOREIGN PATENTS 903,528  8/1962  Great Britain.

JOHN M. HORAN, *Primary Examiner.*

NORTON ANSHER, *Examiner.*

J. F. PETERS, *Assistant Examiner.*